UNITED STATES PATENT OFFICE.

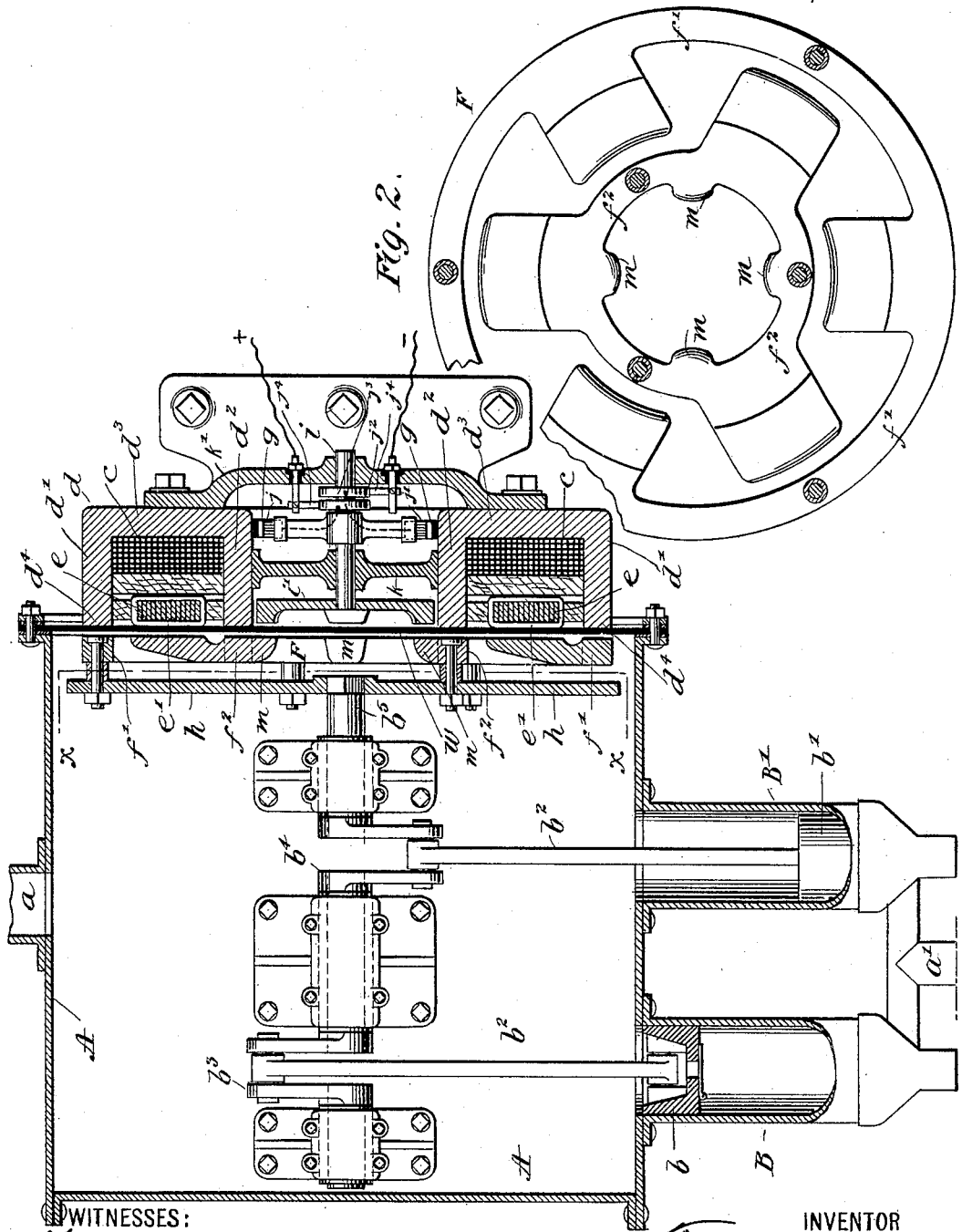

THOMAS J. FAY, OF BROOKLYN, NEW YORK, ASSIGNOR TO THE AMERICAN ELECTRIC COLD SUPPLY COMPANY, OF MAINE.

ELECTRICAL POWER TRANSMISSION.

SPECIFICATION forming part of Letters Patent No. 592,244, dated October 26, 1897.

Application filed February 12, 1897. Serial No. 623,090. (No model.)

*To all whom it may concern:*

Be it known that I, THOMAS J. FAY, a citizen of the United States, residing at Brooklyn, in the county of Kings and State of New York, have invented certain new and useful Improvements in Power Transmission, of which the following is a full, clear, and exact description.

This invention is a means for transmitting power from a certain source of power through the unperforated wall of a sealed casing to a machine located inside of said casing. In an application filed by me September 30, 1896, Serial No. 607,426, I have described a magnetic clutch consisting of a magnet and its armature located, respectively, outside and inside of a sealed casing and mounted, respectively, upon the driving and driven shafts, whereby the driven shaft and machine, of which it is a part, are rotated when the driving-shaft is rotated by reason of the magnetic attraction existing between the magnet and the armature. The source of power in the case referred to was separate and distinct from the magnet-clutch itself and might be an electric, steam, or other suitable motor. In the present case I aim to accomplish substantially the same thing, but by the aid of an electric motor whose stationary member is located outside of the casing and one of whose rotary members is located inside thereof and connected with the machine to be driven. In this way I dispense with a clutch as a separate apparatus and to that extent simplify the plant.

To fully appreciate the value of this invention, it is necessary to understand that the machine to be driven, which is located inside of the casing, acts upon a gas, the leakage of which from the casing is very undesirable, even to the extent which would take place were the driven shaft passed through a stuffing-box in the wall of the casing.

The invention will be described in detail with reference to the accompanying drawings, in which—

Figure 1 is a sectional view of the entire apparatus constituting the invention, and Fig. 2 is a section taken on line $x\,x$ of Fig. 1.

A represents a hermetically-sealed casing into which gas is admitted through the pipe $a$.

B B′ are two pump-cylinders containing pistons $b\,b'$, connected by piston-rods $b^2$ with respective cranks $b^3\,b^4$ upon a shaft $b^5$, mounted in suitable bearings. The function of this pump is to force the gas which enters at $a$ out through a suitable pipe $a'$ to any desired point for consumption or use. The object of my invention is to drive this pump from an external source of power without perforating the wall of the casing A. To this end I have devised a peculiar form of electric motor in which there is no moving wire, and mount the stationary portions of the motor outside of and in close proximity to the wall of the casing, while the main rotating portion of the motor is merely a body of iron and is located inside of the casing directly opposite the stationary portion. A secondary rotating portion of the motor, constituting a commutating-switch, is located outside of the casing and is made to move in unison with the main rotating part inside of the casing by a magnetic flux acting through the wall of the casing. The motor consists of a field-magnet coil $c$, a field-magnet core $d$, an armature $e$, all of which are stationary, and a rotor F and commutator $g$. The field-magnet core is a continuous body of iron in the form of two concentric cylinders $d'$ and $d^2$, connected together by a web $d^3$. The field-coil $c$, being located between the cylinders, creates opposite magnet-poles at the inner or disconnected edges of the cylinders. These edges $d^4$ are continuous rings resting directly against the wall $w$ of the casing A. The armature $e$ is a laminated iron ring wound transversely with coils $e'$, the terminals of which are connected with the stationary segments of the commutator $g$. Inside of the casing and facing the edges of the two cylinders of the field-magnet are two concentric continuous iron rings $f'$ and $f^2$, respectively. These are supported by a spider $h$, from which they are magnetically insulated, said spider being fixed upon shaft $b^5$. The outer ring is provided at intervals with inwardly-projecting pole-pieces, the faces of which stand opposite the armature $e$. The inner ring is provided with outwardly-projecting pole-pieces, having their faces similarly arranged with respect to the armature and being located alternately with respect to the pole-pieces on the outer ring. Thus the pole-pieces are all of the same polarity as the ring to which they are attached, the polarity of the ring being the same as that of the cylinder $d'$ or $d^2$, opposite which it is placed. Coincident with the axis of the field-magnet core is a shaft $i$, carrying at its inner end an iron spider $i'$, the extremities of which are pole-pieces, each having two faces—one opposite the inner cylinder of the field-magnet core and the other opposite the wall $w$. This shaft $i$ carries two brushes $j$ and $j'$, bearing against the commutator $g$, and from the brushes wires lead through the shaft, which is hollow for this purpose, to the respective rings $j^2$ and $j^3$, upon which fixed brushes $j^4$ rest, the brushes being connected with the main leads of the motor. The shaft is mounted in suitable brackets $k$ and $k'$. The inner ring $f^2$ of the rotor is also provided with small inward projections $m$, corresponding in number and position to the poles on the spider $i'$.

The magnetic circuit of the motor leads from one of the cylinders of the field-magnet core through the wall of the diaphragm $w$ to the ring immediately opposite, thence into the pole-pieces connecting with that ring, through the diaphragm $w$, into the armature-core, through arcs of the armature-core to points opposite the pole-pieces connected with the other ring, thence through the diaphragm and into said pole-pieces and ring, thence through the diaphragm to the other cylinder of the field-magnet core, the circuits being finally completed through the web $d^3$. When the current is turned on, the poles created in the armature attract those of the rotor and cause the latter to rotate. The brushes are caused to rotate in unison with the rotor by reason of the shunting or leakage of lines of force from the inner cylinder of the field-magnet core through the polar projections $i^2$, thence through the diaphragm and into the small polar projections $m$. As the brushes rotate the position of the poles on the main armature correspondingly shift and the rotor is kept in motion.

The rotor being connected with the pump the latter is driven and, as will be observed, without the necessity of perforating the wall of the sealed casing.

It may be proposed to combine with a sealed casing an electric motor of the ordinary type whose rotary armature, carrying conductors together with the commutating devices, is located inside of the sealed inclosure, while the stationary field-magnet is located outside; but such a combination I wish to disclaim, inasmuch as it is impracticable to place such moving elements inside of the casing for various reasons, notably the lack of facility in making repairs, for observation of the working of the motor, adjustment of the brushes, &c. The motor herein described is especially adapted for the purpose intended, there being no part thereof which ever need be inspected or repaired located inside of the case. In my motor the rotary part located inside of the case is merely a body of magnetic material forming a part of the field-magnet circuit, the armature being stationary and located outside of the casing.

Having thus described my invention, I claim—

1. The combination with a hermetically-sealed casing within which is a machine to be driven, of an electric motor having a rotary member consisting merely of a body of iron, located inside of said casing, and connecting with the machine to be driven and a stationary member upon which the electrical conductors of the motor are wound, located outside of the casing, an unperforated wall of the casing being located between said rotary and stationary members, substantially as described.

2. The combination with a hermetically-sealed casing in which is located a machine to be driven, of an electric motor having a rotary member located inside of said casing and connected with the machine to be driven, a stationary member located outside of said casing and between which and the rotary member an unperforated wall of the casing is located, and a commutating-switch also located outside of said casing, substantially as described.

3. The combination with a hermetically-sealed casing in which is located a machine to be driven, of an electric motor having a rotary member located inside of said casing and connected with the machine to be driven, a stationary member located outside of said casing and between which and the rotary member an unperforated wall of the casing is located, and a commutating-switch also located outside of said casing, said commutating-switch being moved by the magnetic attraction exerted upon it by the rotary member of the motor inside of the sealed casing.

4. The combination with a hermetically-sealed casing in which is located a machine to be driven, of an electric motor whose armature is stationary and located outside of said casing and a portion of whose field-magnet rotates and is located inside of the casing and connected with the machine to be driven.

In testimony whereof I subscribe my signature in presence of two witnesses.

THOMAS J. FAY.

Witnesses:
FRANK S. OBER,
HARRY BAILEY.